United States Patent [19]

Gerritsen

[11] 4,050,177

[45] Sept. 27, 1977

[54] FOLDABLE FISH NET

[76] Inventor: Allen Gerritsen, 74 Heights Terrace, Middletown, N.J. 07748

[21] Appl. No.: 659,657

[22] Filed: Feb. 20, 1976

[51] Int. Cl.² .............................................. A01K 77/00
[52] U.S. Cl. ....................................................... 43/12
[58] Field of Search ............................................ 43/12

[56] References Cited

U.S. PATENT DOCUMENTS

| 1,957,944 | 5/1934 | Dexter | 43/12 |
| 2,620,585 | 12/1952 | Delcey | 43/12 |
| 2,739,403 | 3/1956 | Kalmus | 43/12 |

Primary Examiner—Russell R. Kinsey
Assistant Examiner—Daniel J. Leach
Attorney, Agent, or Firm—Robert D. Farkas

[57] ABSTRACT

A hand carried fish net includes an extensible telescoping handle having a pair of foldable arms pivotally connected to the end of the handle. The arms are secured in an open position to support a triangular shaped net. The base of the handle is hollow to permit tubular extensions to retract for storage. The arms are collapsed with the net wrapped around them and pivoted back to fold into a slot in the side of the handle base.

2 Claims, 4 Drawing Figures

FOLDABLE FISH NET

BACKGROUND OF THE INVENTION

1. Field of the Invention

The present invention relates to portable fishing nets and particularly to a net having telescoping extensions and a foldable net support which are stored in the handle.

2. Description of the Prior Art

Presently available portable collapsible fishing nets use spring loaded telescoping handles and curved net supports which retract into the handle base in a longitudinal direction. The net portion is often not completely stored or is unwieldy and difficult to compress into the same hollow compartment as the handle extensions. Some devices have pivotable nets which swing back along the handle to provide a compact unit, but do not store the nets within the handle. Such nets are shown in U.S. Pat. No. 3,167,878, issued Feb. 2, 1965, and U.S. Pat. No. 2,739,403, issued Mar. 27, 1956.

SUMMARY OF THE INVENTION

It is therefore the primary object of the present invention to provide a portable fishing net having a telescoping extensible handle which is readily retractable into a hollow base and a pivotable net support which folds into another compartment for full storage in a simplified manner.

This is accomplished by a spring loaded hollow handle and base having tubular telescoping extensions. The end of the handle supports a pair of pivotal arms which are spread open and secured to hold a triangularly shaped net. For storage, the extensions retract into the handle base, the arms are released and closed, and the net is wrapped around the arm which are pivoted back to fold into a separate slot along the side of the handle base. Other objects and advantages will become apparent from the following description in conjunction with the accompanying drawings.

DESCRIPTION OF THE PREFERRED EMBODIMENT

Figure 1:
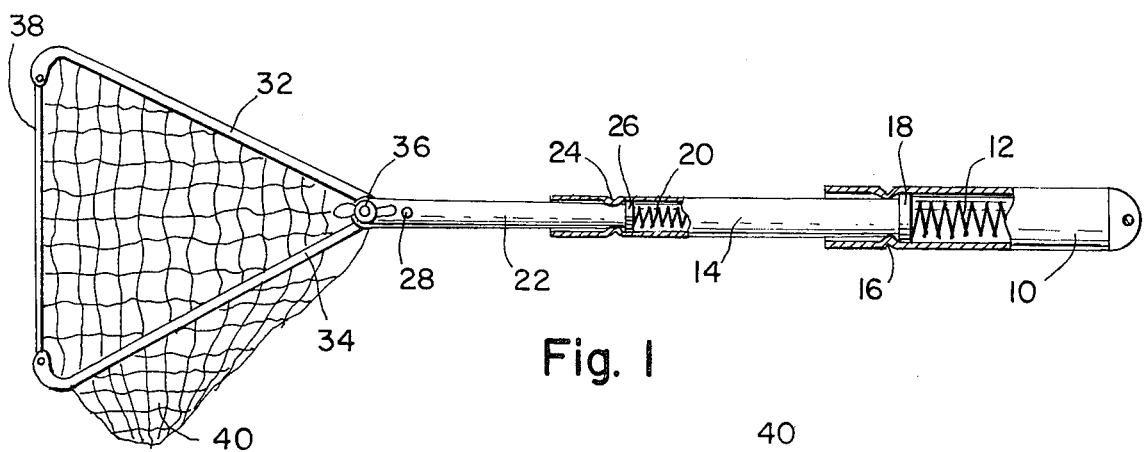
FIG. 1 is a top partial cross-sectional view of the extended handle and net.

As shown in FIG. 1, a hollow handle base 10 includes a spring 12 urging a tubular extension 14 out of the opening in the base. A crimp 16 in the wall of the base engages a stop 18 at the inner end of extension 14 to hold the extension in position. A similar spring 20 within the hollow tube 14 urges a second tubular extension 22 out of the open end. Another crimp 24 in the wall of extension 14 engages a stop 26 at the inner end of extension 22 to hold it in place. The various handle members are preferably of aluminum.

Figure 2:
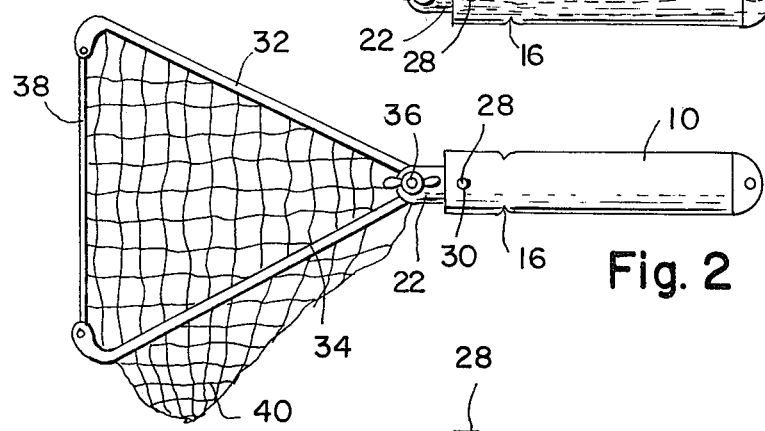
FIG. 2 is a top view of the retracted handle and extending net.

A push button mechanism 28 at the outer end of extension 22 is in a released position which permits the spring loaded handle to rapidly extend to the fully open position. When the extensions are retracted within the hollow handle base, as shown in FIG. 2, the push button engages a hole 30 in the base to retain the extensions.

Attached at the outer end of extension 22, are a pair of pivotally mounted arms 32, 34, of a suitable metal, such as aluminum, which are rigidly secured in a spread apart open position by a wing nut and bolt 36. The open arms are connected at the ends by a laterally extending strong flexible cord 38 to form a wide mouth triangularly shaped frame and sturdy support for a net 40.

Figure 3:
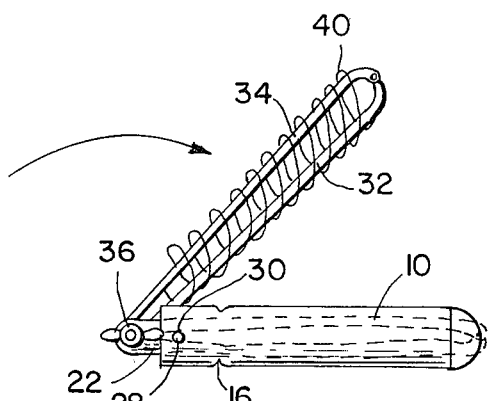
FIG. 3 shows the net and arms in a closed partially pivoted position.
Figure 4:
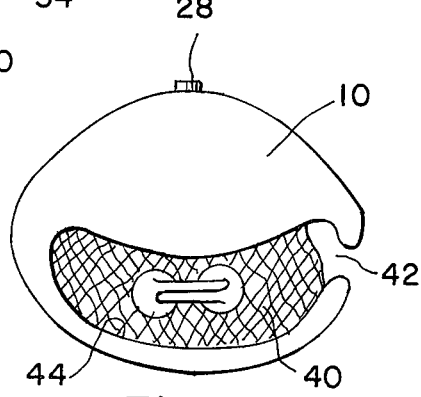
FIG. 4 is an end view of the handle base showing the net in a stored position.

In order to fold the net into a compact closed position, the tubular extensions 22, 14 are telescoped and retracted into the hollow handle base 10 where they are held by push button 28 in hole 30. The wing nut 36 is loosened, and the arms 32, 34 are folded together, as shown in FIG. 3, with the net wrapped around the closed arms. The net and arms are then pivoted back toward the handle base and inserted through a side opening 42 in the base into a separate slotted storage compartment 44, as shown in FIG. 4. The handle base and extensions preferably have an elliptical cross-section to provide a steady grip for the net. The elliptical shape also provides a wide storage compartment which is located at the lower portion of the handle. The upper portion contains the hollow handle with the retracted tubular extensions.

The present invention thus provides a compact simplified portable foldable fish net. While only a single embodiment has been illustrated and described, it is apparent that many variations may be made in the particular design and configuration without departing from the scope of the invention as set forth in the appended claims.

What is claimed is:

1. A foldable fish net comprising:
  a. a hollow tubular handle;
  b. a first tubular extension slidably secured within said handle between extended and retracted positions;
  c. a pair of arms pivotably mounted at the end of said extension;
  d. means for adjustably securing said arms in an open position;
  e. a net mounted between said arms;
  f. a storage compartment in said handle having an opening along a side of said handle to receive said net and arms;
  g. wherein said open arms provide a triangular shaped support for said net; and
  h. wherein a hollow portion of said handle receives said tubular extensions, said hollow portion being separated from said storage compartment.

2. The device of claim 1 including means for limiting the movement of said tubular extension out of said handle, said limiting means for urging said first extension out of said handle, said first extension being hollow and including a second tubular extension slidably secured within said first extension, and a spring within said first extension urging said second extension outwardly, said arms being mounted at the end of said second extension, means for releasably holding said extensions in a retracted position within said handle against said springs.

* * * * *